United States Patent [19]

Thomas, III

[11] Patent Number: 5,638,228

[45] Date of Patent: Jun. 10, 1997

[54] RETROREFLECTIVE MARKER FOR DATA STORAGE CARTRIDGE

[75] Inventor: Fred C. Thomas, III, Kaysville, Utah

[73] Assignee: Iomega Corporation, Roy, Utah

[21] Appl. No.: 388,242

[22] Filed: Feb. 14, 1995

[51] Int. Cl.[6] ............................................ G11B 19/04
[52] U.S. Cl. ........................ 360/60; 360/71; 360/133; 242/344
[58] Field of Search .................... 242/344; 360/60, 360/71, 133, 132; 359/529, 530, 601, 742; 369/272, 274

[56] References Cited

U.S. PATENT DOCUMENTS

| 3,718,078 | 2/1973 | Plummer | 359/742 |
|---|---|---|---|
| 4,633,451 | 12/1986 | Ahn et al. | 369/14 |
| 5,038,359 | 8/1991 | Pepper | 359/529 |
| 5,325,243 | 6/1994 | Roth | 360/71 |
| 5,491,586 | 2/1996 | Phillips | 359/529 |

FOREIGN PATENT DOCUMENTS

| 2135059 | 1/1973 | Germany | 359/530 |
|---|---|---|---|
| 61650 | 2/1992 | Japan | 360/60 |
| 167286 | 6/1992 | Japan | 360/60 |
| 168540 | 6/1994 | Japan | 360/60 |

OTHER PUBLICATIONS

Pat. Abstracts of Japan vol. 18, No. 85, published Feb. 10, 1994 Appl. No. 4–113,999, Sugawara.
"Experiments with retrodirective arrays", *Optical Engineering*, vol. 21, No. 2, Mar./Apr. 1982.
"Retroreflection—What is it and how is it used?", *ASTM Standardization News*, Feb. 1982, J. Rennilson.
"Factor affecting the metrology of retroreflective materials", *Applied Optics*, vol. 19, No. 8, Apr. 1980.
*Scientific American*, "The Amateur Scientist: Wonders with the retroreflector, a mirro that removes distortion from a light beam"; Jearl Walker; Jan. 1988–vol. 258, No. 1. pp. 96–99.

*Primary Examiner*—W. R. Young
*Assistant Examiner*—Alan Faber
*Attorney, Agent, or Firm*—Woodcock Washburn Kurtz Mackiewicz & Norris LLP

[57] ABSTRACT

A cartridge for a data storage disk drive has a retroreflective marker. Light from a source is reflected from the marker almost exactly on its incident path. This property makes possible unique identification of the cartridge with minimal senstivity to light reflected from other surfaces. The marker enables a disk drive enable circuit so that the drive cannot be used with improper cartridges which might damage it. Also, a retroreflective marker is used for write protection of the cartridge.

16 Claims, 5 Drawing Sheets

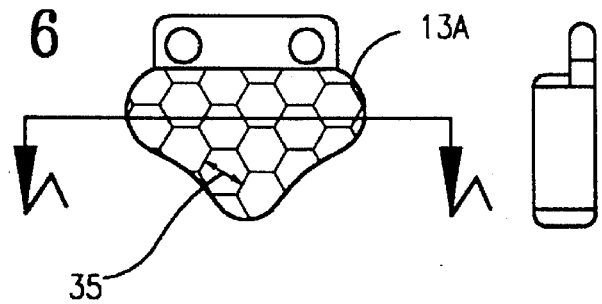
FIG. 6
FIG. 8
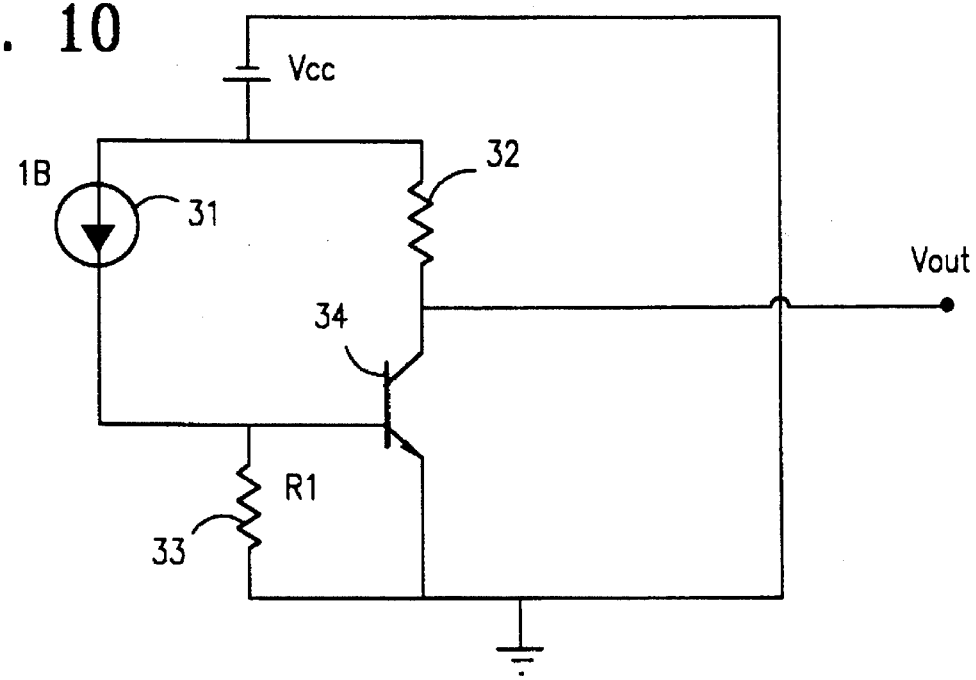
FIG. 10

RETROREFLECTIVE MARKER FOR DATA STORAGE CARTRIDGE

BACKGROUND OF THE INVENTION

1. Field of the Invention

The present invention relates to a removable data storage cartridge and to a data storage drive for receiving same. More particularly, the present invention relates to methods and apparatus for detecting the presence of the correct disk cartridge in the data storage drive, and to protecting against the insertion of incompatible or write protected disk cartridges in the drive.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

When a data storage cartridge is inserted into a drive it is important that the type of cartridge be recognized by the drive as the correct type for safe and reliable use in that particular drive. Most removable cartridge drives (magnetic and optical) typically use approximately the same form factor cartridges, i.e., 3.5", 5.25", etc. Hence if one of these cartridges is inserted into the cartridge slot of the non-mating drive there is a large probability that either the drive (heads, load mechanism, electronics, etc.) or the data on the disk could be damaged.

Also, some cartridges are "write protected" by the user to prevent accidential erasure of important data by writing over it. It is important to protect against operation of the drive when an incorrect or write protected cartridge is inserted.

Recently, retroflective materials have been developed. This material has many periodic miniature corner cubes, or spherical elements, which reflect light striking it almost exactly upon its incident path. Retroflective array materials are described in Jacobs, S. F., "Experiments with retrodirective arrays," *Optical Engineering*, Vol. 21, No. 2, March/April 1982; Rennilson, J., "Retroreflection—What is it and how is it used? " *ASTM Standardization News*, Feb. 1982; and Venable, W. H., Stephenson, H. F. and Tersteiege, H., "Factor affecting the metrology of retroflective materials," *Applied Optics*, Vol. 19, No. 8, Apr. 15, 1980.

It is an object of the present invention to provide a retroreflective marker on a data storage cartridge in order to prevent damage to the drive or the storage medium by insertion and attempted writing/reading of an improper cartridge, or writing on a "write protected" cartridge.

SUMMARY OF THE INVENTION

In accordance with the present invention, a retroreflective marker on a data storage cartridge is detected by a light detector. The data storage cartridge contains a magnetic or optical recording disk or tape for storing data.

Light from a source is reflected by the retroreflective material on almost exactly its incident path. Because of this unique property of the retroreflective material, the detection system is much less range and distance sensitive than other types of reflective material used in conjunction with a light source and light detector.

In the preferred embodiment, an emitter/detector pair with appropriate low cost optics, are positioned in a magnetic disk drive. This emitter/detector pair is connected in a cartridge detection system.

With this optical arrangement and with a fixed brightness emitter there will be some return signal for any diffuse reflector and some return for an optimally orientated specular reflector. But since the nature of light from low cost LED light sources used in drives for cartridge detection is divergent (not collimated or focused), the returns toward the detector drop rapidly as the non-retroreflective reflective material is moved further from the cartridge. The diminishment of reflected signal is significantly less for a retroreflective material. This property is one which allows the invention to discriminate whether the cartridge optical identification marker is of retroreflective material and hence whether the cartridge is of the correct type and is compatible for use in the particular drive.

Alternatively, the marker identifies whether the cartridge is write protected. In other embodiments, the retrodirective tag is a molded acrylic tag.

Advantages of the present invention include its insensitivity to range and angularity of the marker relative to the emitter/detector in the drive as well as the robust nature of the marker and emitter/detector to scratching and tolerance of moderate optical path dust or debris buildup.

The foregoing and other objects, features and advantages of the invention will be better understood from the following more detailed description and appended claims.

SHORT DESCRIPTION OF THE DRAWINGS

FIGS. 6, 7 and 8 are plan, top and edge views respectively of a preferred embodiment of the invention;

FIG. 10 shows a preferred embodiment of the detection circuit;

DESCRIPTION OF THE PREFERRED EMBODIMENT

Figure 1:
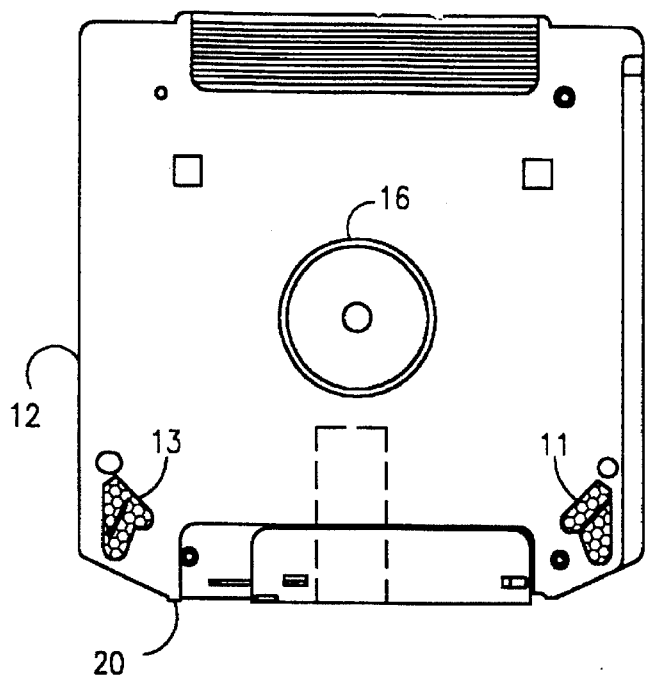
FIG. 1 shows the data storage cartridge of the present invention.
Figure 2:
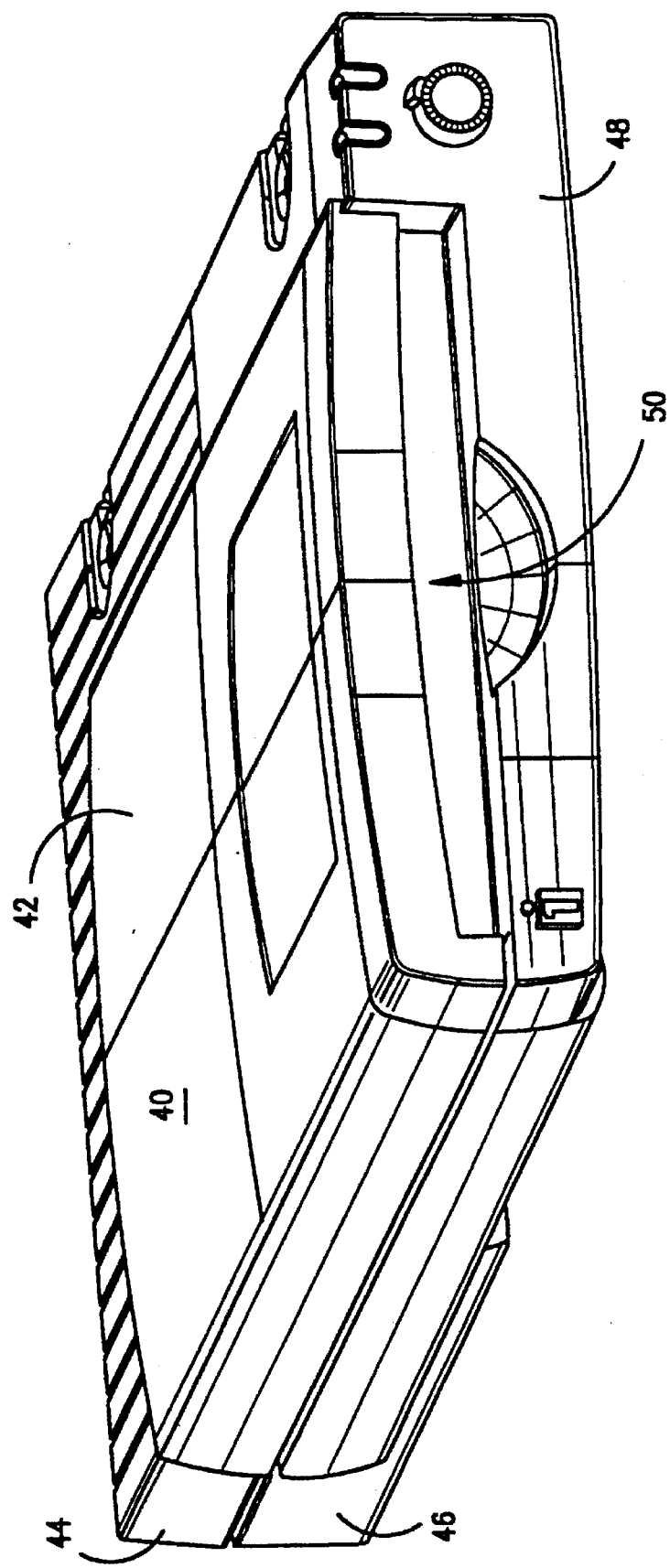
FIG. 2 is a perspective view of a disk drive of the type in which the invention is used.
Figure 3:
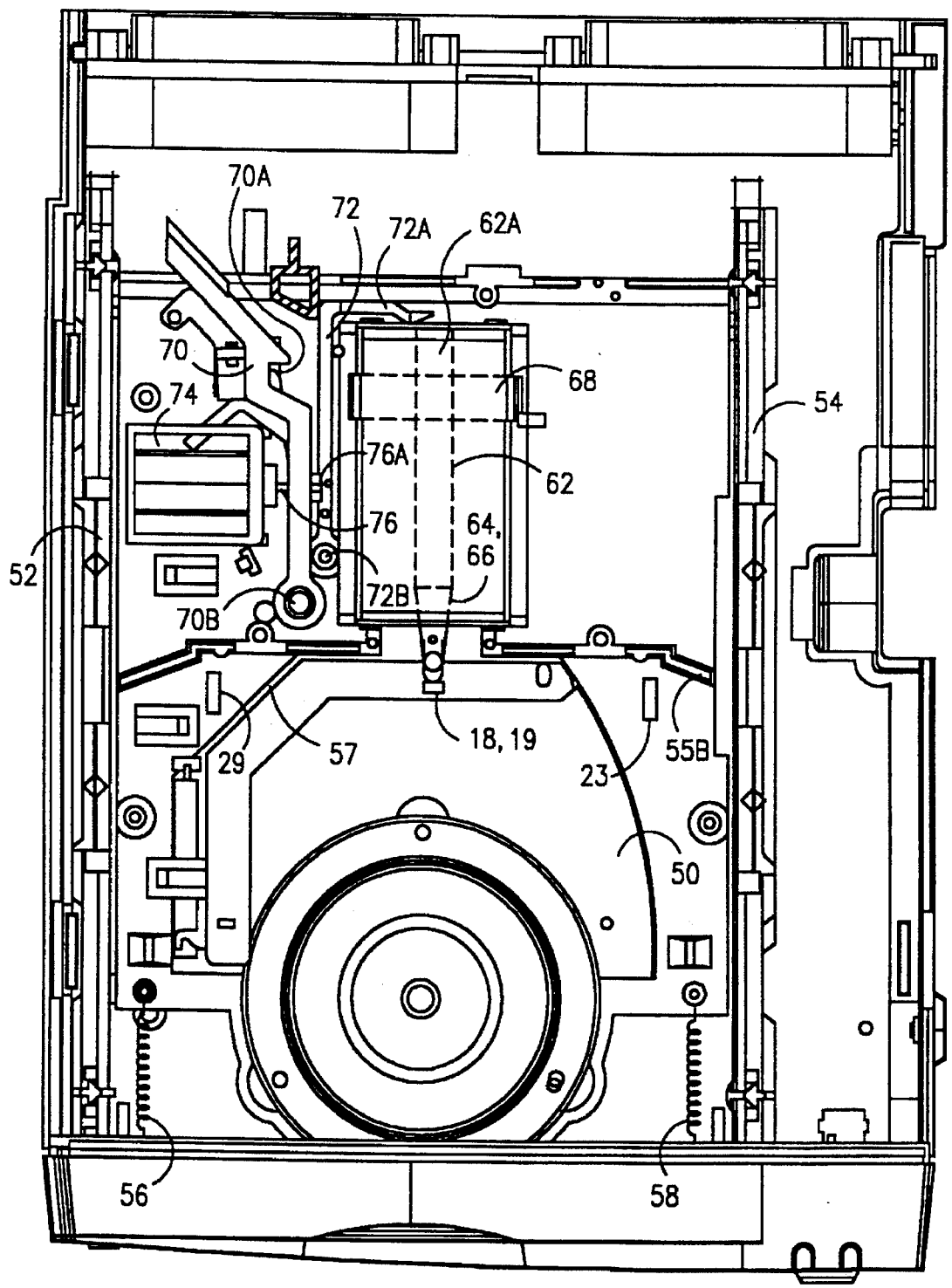
FIG. 3 is a top cut-away view of the disk drive of FIG. 2.

FIGS. 1–3 show the cartridge and the disk drive to which the present invention is applicable. The cartridge and drive are described in co-pending applications entitled "Disk Cartridge and Data Storage Device For Receiving Same", Ser. No. 324,671, filed Oct. 18, 1994, now abandoned (Attorney Docket No. IOM-8907) and "APPARATUS FOR PERFORMING MULTIPLE FUNCTIONS IN A DATA STORAGE DEVICE USING A SINGLE ELECTRO-MECHANICAL DEVICE", Ser. No. 324,808, filed Oct. 18, 1994, now pending (Attorney Docket No. 8906). These disclosures are incorporated herein by reference.

The disk cartridge 10 comprises an outer casing 12 having upper and lower shells that mate to form the casing. A disk-shaped recording medium is affixed to a hub 16 that is rotatably mounted in the casing 12. An opening on the bottom shell of the casing 12 provides access to the disk hub 16. A head access opening in the front peripheral edge 20 of the disk cartridge 10 provides access to the recording surfaces of the disk by the recording heads of a disk drive.

In accordance with the present invention, a retroreflective marker, or tag, 11 is positioned on the cartridge to be detected by the detector in the disk drive. Further in accordance with the invention, a write protected marker 13 of retroreflective material may be applied to the cartridge if it is "write protected".

FIG. 2 shows a data storage device, in this case a disk drive 40, for receiving the disk cartridge 10 of FIG. 1. The disk drive 40 comprises an outer housing 42 having top and bottom covers 44, 46 and a front panel 48. A disk cartridge can be inserted into the disk drive 40 through a horizontal opening 50 in the front panel 48 of the disk drive 40.

FIG. 3 is a top view of the disk drive 40 of the present invention with the top cover 44 removed. The disk drive 40 comprises an internal platform 50 that slides along opposing side rails 52, 54 between a forward position and a rearward position. A pair of springs 56, 58 bias the platform 50 in its foward position.

A linear actuator is mounted on the rear of the platform 50. The linear actuator comprises a carriage assembly 62 having two lightweight flexible arms 64,66. The recording heads 18, 19 of the disk drive are mounted at the ends of the respective arms 64,66. A coil 68, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive.

A head locking lever 72 is also pivotally mounted on the platform 50 about a rotation shaft 72b. A second spring (not shown) is coupled to head locking lever 72 at its rotation shaft 72b also to bias the head locking lever 72 in the X+ direction. An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 18, 19.

A solenoid 74 has a drive shaft 76. When the solenoid 74 is energized by an electrical current, the drive shaft 76 moves in the X direction from a normally extended position toward a retracted position. As the drive shaft 76 of the solenoid 74 moves toward its retracted position, an enlarged operating end 76A of the drive shaft 76 engages the eject latch and head locking levers 70, 72 in order to pull the levers in the X direction against their normal spring bias. Movement of the head locking lever 72 in the X+ direction causes the end 72a of the head locking lever 72 to disengage from the end 62A of the carriage 62, thereby unlocking the actuator and allowing the actuator to move radially of the rotating disk. Similarly, movement of the eject latch lever 70 in the X+ direction causes the cutout X on the eject latch lever to disengage from the latch projection thereby releasing the platform 50 and allowing the platform 50 to move back to its forward position.

Figure 4:
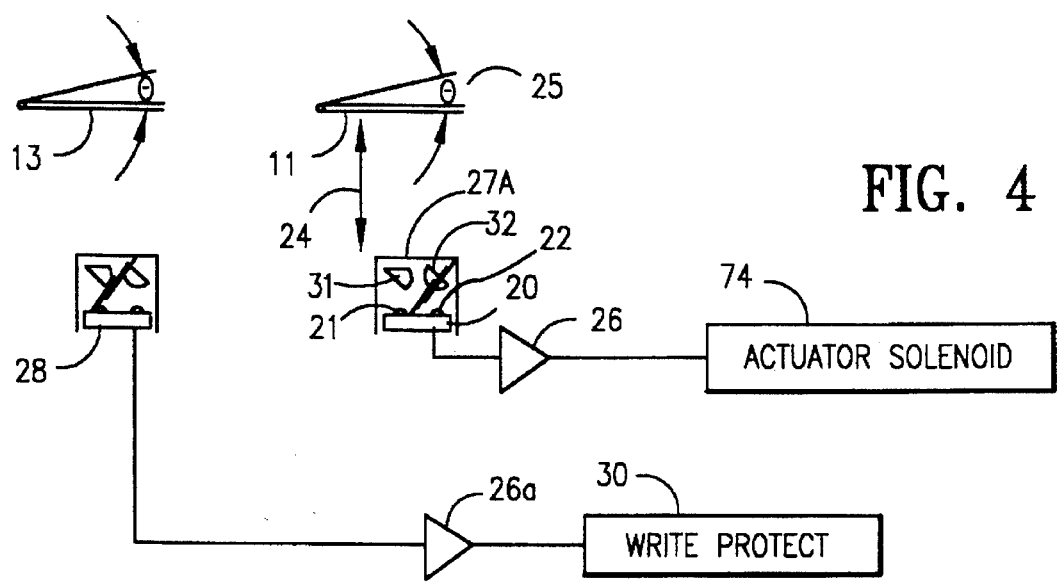
FIG. 4 shows the emitter/detector of the present invention in a circuit controlling the enablement of the disk drive.

In accordance with the present invention, an emitter/detector pair 20 (FIG. 4) is positioned in the drive to detect the retroreflective marker 11 and to unlock the actuator.

The emitter/detector pair 20 includes an LED light source 21 and a detector 22. The emitter/detector pair 20 is positioned on the PC board of the disk drive so that light from the source passes through the slit 23 (FIG. 3) in the base plate, is reflected by marker 11, and travels on its incident path to be detected by detector 22.

The detector 22 is closely spaced to the LED emitter 21. Therefore, the detector will optimally respond to light which is emitted from the source 21, reflected from the retroreflective material in the marker 11, and is incident upon the emitter/detector pair 20 (E/D pair) along the same wavepath that the light was emitted. Because of the unique characteristics of the retroreflective material in the marker 11, the spacing between the marker 11 and the detector 13 is not critical. The spacing is denoted by the arrow 24. Similarly, the angular tolerance, denoted by the angle 25 is not critical.

The signal from the detector 22 is applied through suitable electronics 26 to enable actuation of solenoid 74, thereby allowing the drive to access the cartridge.

It can be shown that other reflective surfaces will not reflect sufficient light to the detector to produce actuation. Even a highly polished flat mirror will not reflect sufficient light to the detector because of the divergent nature of its reflection from a divergent source. Similarly, a diffuse reflector has so much scattering of light at the surface that the return will be at least an order of magnitude less than that from the retroreflective surface. Glass beads, or a reflective lens system (i.e., Fresnel) reflect about the same amount of light (assuming no absorption at the surface). The critical difference is the amount reflected back upon the incident path. This is about an order of magnitude better with a retroreflective array like Reflexite. Glass beads are close to being retroreflective, but the on axis reflection (back at zero degrees relative to the incident light) is about an order of magnitude poorer.

In order to further discriminate against detection of light from reflectors other than retroreflective ones, a textured lens cover 27 (FIG. 4) is provided. Internal curved optical surfaces 1 and 32 (FIG. 5) expand the reflected optical irradiance such that its convergence is transferred to the detector 22 in order that the return detected optical signal is maximized. The prism lens 27A is used to redirect light reflected by the retroreflective array material, which would otherwise be directed back at its source, toward the photosensor 22. If the appropriate prism lens is not used, the retroreflected light will be reflected back into the source LED 21.

Features may be added to the lens prism which help frustrate the use of other types of reflective materials and also the use of a lens in conjunction with other reflective materials. For example, surface roughness or wariness of the top of the lens prism which has a spatial frequency of less than the pitch of the retroreflective elements (0.006") will be corrected by optically using the retroreflective cartridge marker. This will frustrate the use of both ordinary mirrors and reflectors used in conjunction with lenses. Just putting an angular surface on the front face of the prism lens will frustrate the use of polished mirrors if the angle is made large enough. The corrective polished mirror that would be required is of such a large tilt angle that it would be difficult, if not impossible, to locate on a cartridge. If a mirror is oriented just right, some light will get back to the receiver, but this amount decreases in an exponential manner as the mirror is moved away from the source. This is not the case with the retroreflective material. The decrease with distance is linear with a very gradual slope.

In accordance with the invention, a retroreflective write protection marker 13 may be provided on the cartridge. The presence of this marker is detected in a manner similar to the detection of the marker 11. An emitter detector pair 28 (FIG. 4) detects marker 13 through slit 29 (FIG. 3) in the base plate. The detector output is applied through suitable electronics 26a to the write protect circuitry 30. This is used for write protection on the cartridge.

Figure 5:
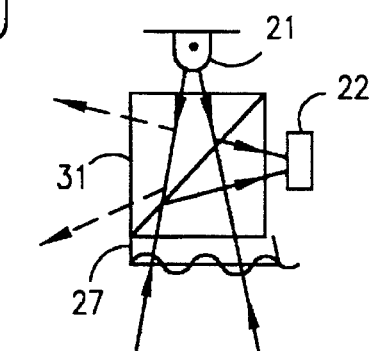
FIG. 5 shows an embodiment of the invention with a beam splitter.

FIG. 5 shows an embodiment of the invention in which a beam splitter 31 redirects the reflected light to the detector 22. This embodiment is useful where the source 21 is not in the same package as the detector 22.

Appropriate optical baffling can be used and optical element surface angularity can be used to reduce emitter back scatter to the detector which is a source of cartridge detection noise.

Retrodirective or optical phase conjugate-type materials are included within the definition of retroreflective as used herein. One commercial material suitable for use is available from Reflexite Corporation, under their designation "AP 1000" or Reflexite. This is a thin plastic sheet material with tiny (0.006" pitch) retroreflective elements embossed into it. This embodiment requires a "lens prism" such that the reflected light will be redirected into the detector (phototransistor).

Figure 9:
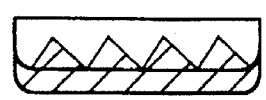
FIG. 9 is a section on the section line of FIG. 6.
Figure 7:
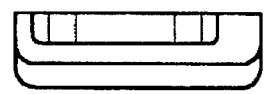
Figure 11:
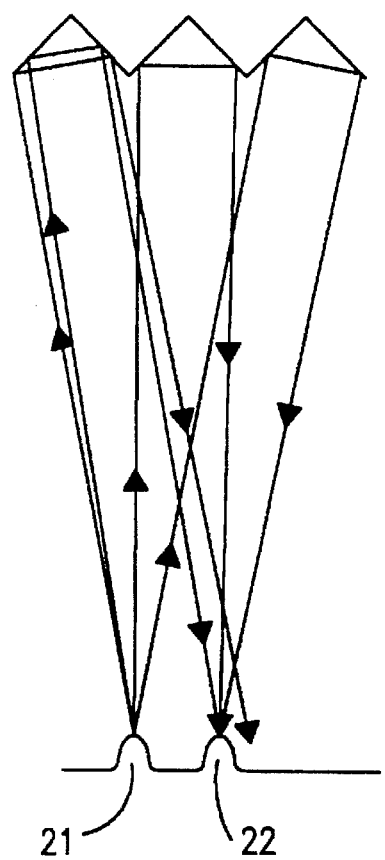
FIG. 11 is a ray trace of some diffuse source rays returning from the tag to the detractor.
Figure 12:
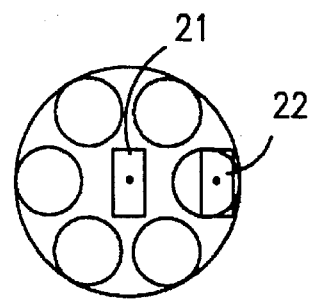
FIG. 12 shows the reflected irradiance distribution.

In order to reduce the cost of implementing the invention, an acrylic retroreflective marker, or tag 13A, shown in FIGS. 7–9 is used. This tag is an array of retroreflective corner cubes whose pitch and flat-to-flat distance is slightly greater than the distance between the emitter/detector (E/D) pair used to sense the tag. The pitch on the tag's corner cubes is 94 mils while the LED is spaced 70 mils from the phototransistor in the E/D pair. The E/D pair senses a fairly reflective object at 0.7 mm. The distance in the drive from the pair to the cartridge is about 13 mm. The ability to sense the tag at this long distance comes from the fact that each corner-cube element nine in the tag of the preferred embodiment) reflects the diffuse incident light back at the LED with an illuminance profile that is annular. If a retroreflector has a size (diameter) which is slightly greater than 70 mils, i.e., 94 mils, the returned light distribution from each retroreflective element will have a donut shaped distribution around the center of the emitter. The donut's radius will about 94 mils. As can be seen from FIGS. 11 and 12, a segment, or lobe, of this donut illuminates the 15 detector 22. There are six peak lobes in the irradiance distribution of FIG. 12. This is from the hexagonal shape of each element in the tag 13A. (See FIG. 6).

Not as much light is returned to the detector as with the embodiment of using a sheet material such as Reflexite, and the lens/prism but there is significantly more than returned from a diffuse reflector or a polished mirror.

The OD radius of the donut is approximately the diameter, or flat-to-flat, distance 35 of the corner cubes, i.e., 94 mils. Hence, the phototransistor at 70 mils from the center of the LED views a segment of this reflected annular irradiance. Reflection off a polished mirror or white piece of paper at this distance is so diffuse and angle insensitive that the irradiance return to the phototransistor aperture is small by comparison.

As further illustration, if the retroelements were 1" in diameter, the return donut of light would be 2" in diameter. From this example, it can also be seen that in order to maximize the return to the detector using this retroreflection scheme, it is important to only oversize the retro element's diameter slightly larger that the spacing between the source of irradiance and sensing elements (emitter/detector).

Hence, the differences in the return of light from the two retroreflective materials, Reflexite and a molded acrylic tag, are basically in the diameter of the returned spot of illumination. With the Reflexite, the retroreflected spot is about 12 mils. in diameter and requires the "lens prism" to redirect light to the detector for sensing.

It should also be noted that by getting rid of the "lens prism" some of the modes of discriminating against other types of light directing tags has been reduced.

A suitable emitter/detector is commercially available, for example, from Sharp Corporation and designated Model No. GP 2S27. It is the E/D pair 31 in the circuit of FIG. 10. Resistor 32 is 10K and has a tolerance of +/−5%. The 2N3904 transistor 34 has a +/−50% tolerance on its Beta, the E/D pair 31 has a 2:1 range for phototransistor output current given a particular reflective target. The optical elements in the tag marker 13 have a variance range of about 20% in their reflective efficiency.

Based on test data and some simulations, resistor 33 in the circuit was selected to be 50K ohms to give adequate sensitivity to the tag while also providing significant rejection to diffuse or specular reflective tag substitutes. Tests show that there is close to an order of magnitude difference in the output signal from E/D pair 31 for a typical (avg.) retroreflective tag and typical (avg.) E/D pair versus the output seen from a mirror or white piece of paper by a hot E/D pair. The tests also show that there is about a 2 to 2.5 times margin between the signal seen from a specular or diffuse tag substitute and the cartridge detection threshold. The preferred embodiment also includes some margin for low end E/D pairs with low end tags which are scratched or otherwise optically degraded through use. The detector still functions with these low end conditions.

Other embodiments of the invention are possible. The appended claims are, therefore, intended to cover all embodiments within the true spirit and scope of the invention.

What is claimed is:

1. A cartridge for a data storage drive which has a source of irradiance and a detector of said irradiance for determining whether the cartridge is suitable for use in said drive, said cartridge comprising:

a body;

a data storage medium in said body; and a marker on said body, said marker being a retroreflective material which reflects irradiance from said source back toward said source for detection by said detector which thereby identifies said cartridge as being suitable for use in that drive.

2. The cartridge recited in claim 1 wherein said retroreflective material has periodic elements which reflect light upon its incident path.

3. The cartridge recited in claim 1 wherein said retroreflective marker is an indicator of whether the cartridge is correct and compatible for use in said drive.

4. The cartridge recited in claim 1 wherein said marker indicates whether the cartridge is write protected.

5. The cartridge recited in claim 1 wherein said retroreflective marker is an array of corner cubes.

6. The cartridge recited in claim 5 wherein each corner cube reflects light with an annular profile.

7. The cartridge recited in claim 6 wherein the outside diameter of said annular profile is approximately the flat-to-flat distance of said corner cubes.

8. The combination of a data storage drive and a cartridge for said drive, said drive comprising:

a source of irradiance;

a detector of reflected irradiance; and means for enabling said drive when reflected irradiance exceeds a predetermined level, said cartridge comprising:

a body;

a data storage medium in said body; and a retroreflective marker on said cartridge, said detector being connected to enable said means for enabling said disk drive when light from said retroreflective marker exceeds a predetermined level.

9. The combination recited in claim 8 wherein said marker is a retroreflective material which has periodic elements which reflect light upon its incident path.

10. The combination recited in claim 8 wherein said source and said detector are closely spaced.

11. The combination recited in claim 8 further comprising:

a beam splitter for redirecting light reflected from said marker to said detector.

12. The combination recited in claim 8 further comprising:

a textured lens for said detector, said textured lens discriminating against light reflected from other than a retroreflective material by distorting light reflected from other than a retroreflective material.

13. The combination recited in claim 8 wherein said retroreflective marker is an array of corner cubes having a pitch and flat-to-flat distance slightly greater than the distance between said source and said detector.

14. The combination recited in claim 13, wherein each corner cube reflects light with an annular irradiance profile centered around said source.

15. The combination recited in claim 14 wherein the outside diameter of said irradiance profile is approximately the flat-to-flat distance of said corner cubes.

16. The combination recited in claim 14 wherein a segment of said annular irradiance profile is incident upon said detector.

* * * * *

UNITED STATES PATENT AND TRADEMARK OFFICE
CERTIFICATE OF CORRECTION

PATENT NO. : 5,638,228
DATED : June 10, 1997
INVENTOR(S) : Fred C. Thomas

It is certified that error appears in the above-indentified patent and that said Letters Patent is hereby corrected as shown below:

On the title page, item [57]
In the Abstract - line 5, "senstivity" should be --sensitivity--.

Col. 3, line 45, "foward" should be --forward--

Col. 4, line 7, "X+" should be --X--

Col. 4, line 8, "72a" should be --72A--

Col. 4, line 10, "X+" should be --X--

Col. 4, line 10, "X" should be --70A--.

Col. 4, line 57, "1" should be --31--.

Col. 5, line 2, "wariness" should be --waviness--.

Signed and Sealed this

Eighteenth Day of November 1997

Attest:

BRUCE LEHMAN

Attesting Officer

Commissioner of Patents and Trademarks